United States Patent [19]

Skrobko

[11] Patent Number: 5,442,472
[45] Date of Patent: Aug. 15, 1995

[54] FIBER OPTIC STATUS MONITORING SYSTEM

[75] Inventor: John Skrobko, Berkeley Lake, Ga.

[73] Assignee: Scientific-Atlanta, Inc., Norcross, Ga.

[21] Appl. No.: 306,448

[22] Filed: Sep. 19, 1994

Related U.S. Application Data

[63] Continuation of Ser. No. 753,581, Sep. 3, 1991, abandoned.

[51] Int. Cl.⁶ ............................................. H04B 10/08
[52] U.S. Cl. .................................... 359/110; 359/167; 359/143; 455/4.2; 348/10
[58] Field of Search .................. 348/10, 11, 12; 455/2, 455/4.2, 5.1; 359/110, 124, 125, 137, 154, 152, 173, 167, 157, 143, 144; 370/124, 85.7, 88.8, 85.9

[56] References Cited

U.S. PATENT DOCUMENTS

| | | | |
|---|---|---|---|
| 4,322,854 | 3/1982 | Bunden et al. | 455/5.1 |
| 4,343,042 | 8/1982 | Schrock et al. | 455/5.1 |
| 4,365,249 | 12/1982 | Tabata | 455/2 |
| 4,451,916 | 5/1984 | Casper et al. | 359/152 |
| 4,512,033 | 4/1985 | Schrock | 455/2 |
| 4,574,305 | 3/1986 | Campbell et al. | 455/5.1 |
| 4,616,214 | 10/1986 | Naito | 455/5.1 |
| 4,648,123 | 3/1987 | Schrock | 455/5.1 |
| 4,733,223 | 3/1988 | Gilbert | 340/505 |
| 4,752,954 | 6/1988 | Masuko | 455/5.1 |
| 4,994,909 | 2/1991 | Graves | 455/5.1 |
| 5,063,595 | 11/1991 | Ballance | 359/152 |
| 5,093,568 | 3/1992 | Maycock | 359/110 |
| 5,150,243 | 9/1992 | Suzuki | 359/110 |
| 5,191,459 | 3/1993 | Thompson et al. | 359/133 |

OTHER PUBLICATIONS

Distribution Equipment, "Model 6585 Status Monitoring/Reverse Switching System"; pp. 54–56.
Distribution Equipment, "Interactive Transponder Module, Part No. 370760"; p. 57.
J. Staiger, "Status Monitoring in Fiber and Coaxial Systems", in *Communications Technology* 46, 47, 159 (Jun. 1991).
Silvano D'Agostino, "Cable Television Monitoring System" in Conference and Exhibition on Television Techniques 119-26 (Jun. 12–14, 1990).
Gudrun Busch & Klaus Bechtold, "The Analog Optical Fiber CATV Transmission System" in CATV Sessions Symposium Record 295-305 (Jun. 14, 1991).
"Anwendung Von Lichtwellenleitern In Kabelfernsehnetzen" in CATV Sessions Symposium Record 270-87 (Jun. 14, 1991).

*Primary Examiner*—Leo H. Boudreau
*Assistant Examiner*—Rafael Bacares
*Attorney, Agent, or Firm*—Banner & Allegretti, Ltd.

[57] ABSTRACT

A fiber optic status monitoring system for a fiber optic cable television system is disclosed in which a computer serially polls a plurality of optical transmitter modules, optical receiver modules, or other cable television component modules to determine their operation. Each of the monitored components at a given location are connected together together by a common bus. In addition, each of the transmitter modules and the receiver modules include a monitoring/control unit. The computer transmits a command signal to an interface unit. The interface unit transmits the command signal to the transmitter modules via a bus. The command signal is modulated at the interface unit and transmitted over a bidirectional link. The modulated command signal is received and demodulated by a status monitoring interface unit. The status monitoring interface unit distributes the command signal to each of the monitored modules at that location. If the command signal is a query command signal, a monitoring unit transmits information on the operation of the module. If the command signal is a control command signal, a monitoring unit serves to supply control signals to the module.

51 Claims, 5 Drawing Sheets

FIBER OPTIC STATUS MONITORING SYSTEM

This application is a continuation of application Ser. No. 07/753,581, filed Sep. 3, 1991, now abandoned.

BACKGROUND OF THE INVENTION

1. Field of the Invention

The present invention relates to a status monitor and control system for use in a fiber optic communications system. In particular, the invention relates to a status monitoring system for a fiber optic CATV system, where the status monitoring system remotely monitors the operation of system components, provides information related to the performance of the system, and remotely controls certain operations of the system.

2. Description of the Related Art

Cable television operators have in the past utilized status monitoring systems to monitor the performance of outdoor pole mounted equipment. These monitoring systems have proven useful in isolating system faults. Conventional coaxial cable television systems are configured with a plurality of amplifiers connected in cascade along a coaxial RF transmission line. Due to the cascaded interconnections, failure in one amplifier causes a signal outage in all other amplifiers down the line. The monitoring systems transfer data using modulated frequency carriers to and from each amplifier station through the coaxial RF path. Accordingly, each amplifier station includes a forward path receiver and a reverse path transmitter. Additionally, data encoders and decoders are provided in the amplifier stations.

In recent years, there has been a great deal of interest in the transmission of video signals via optical fiber. This mode of signal transmission offers a number of advantages over transmitting signals over conventional 75 ohm coaxial cable as video signal distribution is now commonly accomplished in CATV systems. Optical fibers intrinsically have more information-carrying capacity than do coaxial cables. In addition, there is less signal attenuation in optical fibers than in coaxial cables adapted for carrying radio frequency signals. Consequently, optical fibers can span longer distances between signal regenerators than is possible with coaxial cable. In addition, the dielectric nature of optical fiber eliminates any problem with electrical shorting. Finally, optical fiber is immune to ambient electromagnetic interference (EMI) and generates no EMI of its own.

However, the monitoring systems for conventional cable systems are not adapted for use in monitoring fiber optic cable television systems due to inherent differences between the systems. For example, transmitter and receiver pairs in fiber systems serve large geographic areas. Intermediate amplifiers are not common. Therefore, loss in one fiber link is equivalent to loss of an entire coaxial trunk. Accordingly, it is extremely important that an operator be able to identify and isolate the cause of service outages. It is also important that an operator be made aware of warning signs which indicate the likelihood that a failure will occur.

SUMMARY OF THE INVENTION

The present invention provides a system for monitoring the performance of a fiber optic communication system. The monitoring system of the present invention differs from status monitoring systems currently used with conventional coaxial cables. While the inventive status monitoring system may be used with conventional coaxial trunk amplifiers systems, it can also monitor fiber optic nodes.

The instant status monitoring system provides several advantages. At each location, system components are coupled to a common data bus. At remote locations, the common data bus is coupled to a transmitter for communication with a central location. This permits information to be transferred to and from each component without providing each component with its own modulator and demodulator. A particular component may be polled or all components may be polled sequentially. The status monitoring system of the present invention is compatible with existing status monitoring systems for monitoring coaxial system performance which are currently in place and can also perform several control operations.

In the fiber optic cable television system monitored by the present invention, a forward path fiber link connects a master hub with a remote hub. The remote hubs are further coupled to the master hub through a reverse path link. Each remote hub includes a plurality of system components and a status monitor interface unit to which the components are connected via a common data bus. The status monitor interface unit facilitates data transmission between the components at the remote hub and the master hub. Data transferred from the remote hubs is processed at a computer located at the master hub.

By providing a data bus which is common to the system components at a given location, the electronics and interconnections required for status monitoring and control are simplified. The common data bus permits system expansion by simply connecting additional modules to the existing modules. The common bus includes three lines: a transmit data line, a receive data line, and a transmit enable line.

Only a single component is polled at a time. At a remote hub, the polled component sends a response over the common data bus to the status monitor interface unit, which response is then transmitted back to the computer in the master hub. At remote hubs, the transmit enable line is used when the data is sent back to the master hub. The transmit enable signal is provided to the local transmitter prior to sending component status data. This ensures that only one transmitter is returning data at any given time.

BRIEF DESCRIPTION OF THE DRAWINGS

A more complete appreciation of the present invention and many of the attendant advantages thereof will be readily obtained by reference to the following detailed description when considered in connection with the accompanying drawings.

DETAILED DESCRIPTION OF THE PREFERRED EMBODIMENTS

Figure 1:
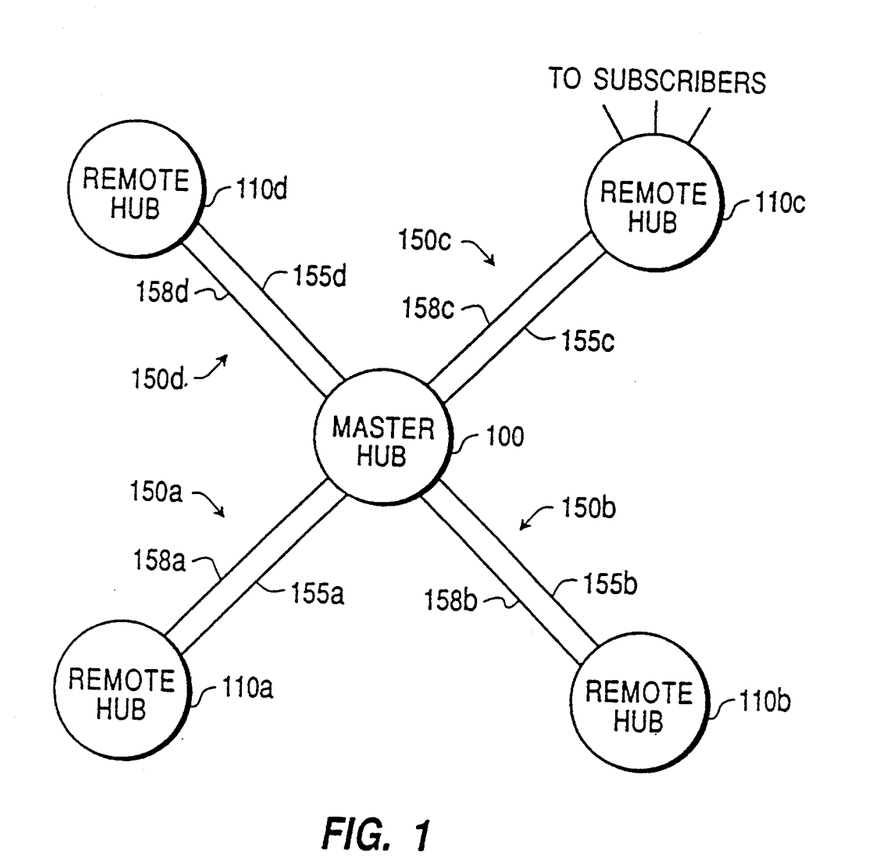
FIG. 1 is an overall system diagram of a fiber communications system in which the status monitoring system of the present invention may be implemented.
Figure 2:
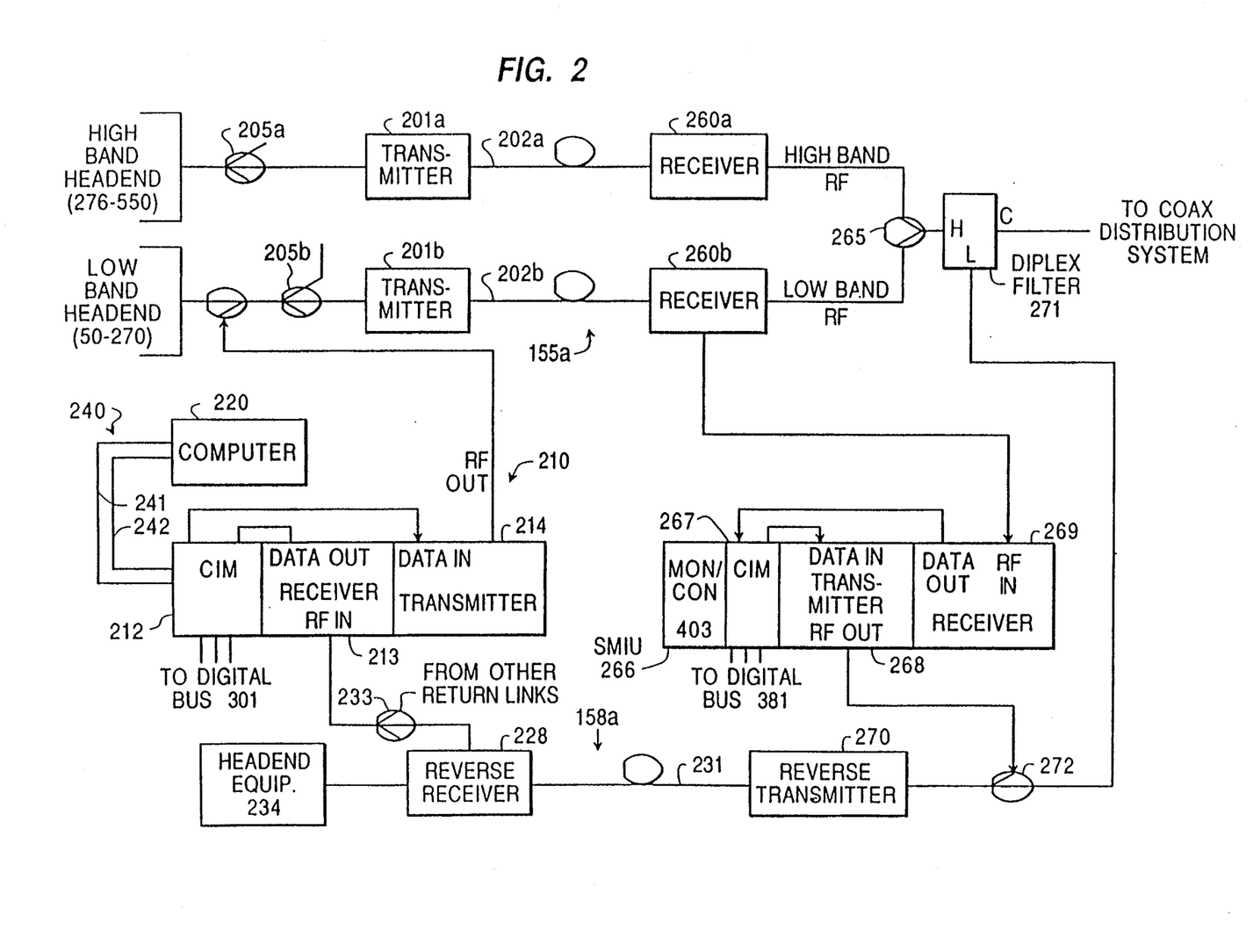
FIG. 2 is a system block diagram illustrating the status monitoring system of the present invention.

With reference to FIGS. 1 and 2, the overall status monitoring system of the present invention as implemented in fiber communications system will be described. The communication system includes a master hub 100 and remote hubs 110a–d connected to master hub 100 via bidirectional fiber links generally indicated as 150a–d. Each bidirectional link includes a forward path 155 and a reverse path 158. Each forward path 155a–d includes one or more optical fibers. Each reverse path also includes one or more optical fibers. Although reverse paths 158a–d are preferably fiber optic paths, the invention is not limited in this respect. Master hub 100 may be located at the headend of a CATV fiber system and typically includes a plurality of transmitters for transmitting optical signals over fibers of forward path 155 to optical receivers at remote hubs 110a–d. Remote hubs 110a–d are located remote from master hub 100 and typically function to convert optical signals from the master hub to RF signals for distribution to subscribers. Alternatively, one or more remote hubs may include transmitters for transmitting the optical signals received from the master hub to additional remote hubs.

FIG. 2 is a block diagram of master hub 100 and remote hub 110a of FIG. 1. Master hub 100 includes transmitters 201a and 201b for respectively transmitting optical signals over fibers 202a and 202b. As shown, lowband signals (for example, 50–276 Mhz) are supplied to transmitter 201b and highband signals (for example, 276–450 or 550 Mhz) are supplied to transmitter 201a. Splitters 205a and 205b may be provided to supply these highband and lowband signals to additional transmitters (not shown) for transmitting to other remote hubs.

The master hub also includes RF subsystem 210. RF subsystem 210 includes communications interface module (CIM) 212, receiver 213, and transmitter 214. CIM 212 includes buffers and drivers for data transfer. CIM 212 is coupled to a "DATA IN" port of transmitter 214 and a "DATA OUT" port of receiver 213. Transmitter 214 outputs an 75.25 MHz RF signal and receiver 213 receives a 17.5 MHz RF signal. Computer 220 is the central control for the entire status monitoring system and is preferably an IBM PS/2 personal computer, but any computer may be used. Communication link 240, such as an RS-232 link having first and second lines 241, 242 couples computer 220 to CIM 212.

Master hub 100 also includes a reverse receiver 228 for receiving optical signals from remote hub 110a over optical fiber 231. The reverse path from the remote hub to the master hub may be a reduced bandwidth link. Reverse receiver 228 receives optical signals and generates RF signals which are supplied to reprocessing headend equipment 234, which may include, for example, equipment for processing video information, subscriber billing equipment, and the like. A 17.5 MHz status monitoring signal is supplied to the "RF IN" port of receiver 213. Receiver 213 demodulates this signal and outputs data from a "DATA OUT" port to CIM 212 for recovery by computer 220. Master hub 100 includes reverse receivers (not shown) for each reverse path from remote hubs to the master hub. The 17.5 MHz status monitoring signals from these other reverse receivers are supplied to the "RF IN" port of receiver 213 via combiner 233.

A 75.25 MHz RF signal is output from the "RF OUT" port of transmitter 214. This RF signal is combined with the lowband RF input to transmitter 201b for transmission to remote hub 110a or, via splitter 205b, to one of the other remote hubs (see FIG. 1). Queries for transmission to remote hubs are provided from computer 220 via CIM 212 to the "DATA IN" port of transmitter 214.

Remote hub 110a includes receivers 260a and 260b for respectively receiving the signals from transmitters 201a and 201b. The high band RF output of receiver 260a and the lowband RF output of receiver 260b are combined by combiner 265 to produce a single RF output. Remote hub 110a also includes status monitoring interface unit (SMIU) 266. SMUI 266 includes communications interface manager (CIM) 267, transmitter 268, receiver 269, and monitor/control unit 403. CIM 267 is connected to monitor/control unit 403 via parallel connection (not shown) from common bus 381. Monitor/control unit 403 serves to monitor the operation of SMIU 266. Reverse transmitter 270 transmits an optical signal over optical fiber 231 from remote hub 110a to master hub 100. Reverse transmitter 270 receives reverse RF in a 5–30 Mhz band from the coaxial cable via diplex filter 271. A 17.5 MHz signal from transmitter 268 is also provided via combiner 272 to the reverse transmitter. This 17.5 Mhz signal contains the status monitoring information.

Receiver 260b supplies the 75.25 MHz query signal to an "RF IN" port of receiver 269 of SMUI 266. Receiver 269 demodulates the signal and provides the demodulated data from a "DATA OUT" port to CIM 267. The data may then be provided over the common bus to system components at remote hub 110a and to monitor/control unit 403 of SMUI 266. Transmitter 268 of SMIU 266 receives data from CIM 267 at a "DATA IN" port and outputs an FSK modulated 17.5 MHz signal for transmission to the master hub at an "RF OUT" port. Thus, data from the common bus may be provided to transmitter 268 via CIM 267 for transmission to the master hub.

Figure 3:
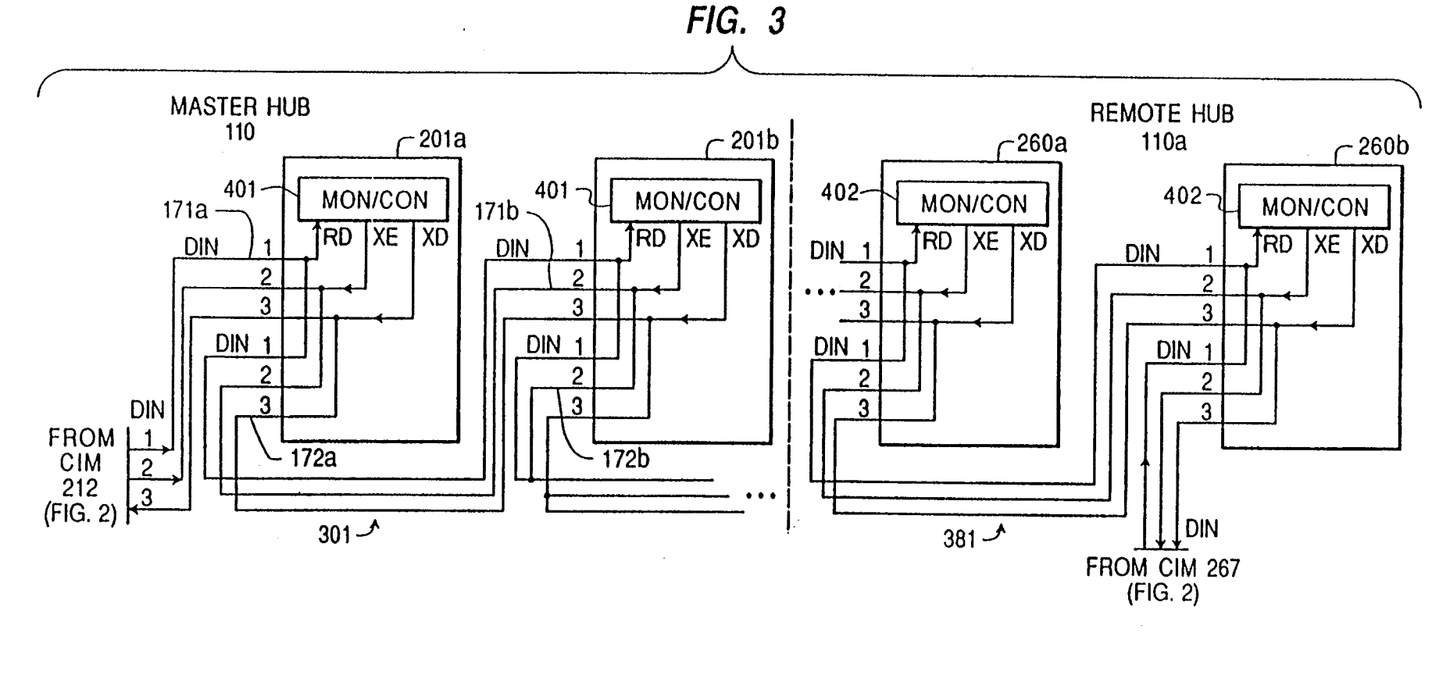
FIG. 3 is a block diagram illustrating the common bus connections between the transmitters 201 and the common bus between the receivers 260 utilized in the present invention.

FIG. 3 illustrates the connection of components at the master hub and the remote hub to a common data bus. Specifically, at master hub 100, each of transmitters 201a and 201b includes a first bus port 171 and a second bus port 172. Bus ports 171 and 172 are connected in parallel within transmitters 201a and 201b. The bus port of CIM 212 is connected via serial bus 301 to bus port 171a of transmitter 201a. Port 172a of transmitter 201a is connected via the bus to port 171b of transmitter 201b. Port 172b of transmitter 201b may be connected via the bus to a port 171c of a third component (not shown). While only two components are illustrated, other components may be connected as described above. These components may include, for example, transmitters for transmitting to other remote hubs, reverse receivers for receiving signals from the remote hubs, etc. At remote hub 110a, the components are coupled to data bus 381 in the same manner as described with respect to the master hub. Other components at the remote hub include, for example, the reverse transmitter. As at the master hub, each component is coupled to bus 381.

The bus contains three lines: a transmit line XMT, a transmit enable line XEN, and a receive line RCV. The descriptions of the individual lines are derived from the perspective of the computer 220. The transmit and receive lines carry digital data (0 VOLTS–5 VOLTS) at a rate of 9600 baud. The transmit line XMT provides the commands from computer 220 to each component. The receive line RCV serves to transfer data from the components back to computer 220. The transmit enable line XEN is provided for bus lines both at the master hub and the remote hub. At remote hub 110a when replying to a query command, a component signals the transmitter 268 via the transmit enable line XEN to initiate a transmission. The transmit enable signal permits the transmitter 268 to get up to level and key on frequency. In this manner it is assured that only one transmitter is sending data at any given time. Since the computer is located at the master hub, components at the master hub do not utilize the transmit enable line XEN.

Within each component the bus ports are connected to a monitor/control unit. The monitor/control units are individually configured for particular applications. For example, monitor/control units 401 in transmitter 201a and 201b are configured as transmitter units and units 402 in receivers 260a and 260b are configured as receiver units. Monitor/control unit 403 of status monitoring unit 266 is configured as a SMIU unit. Each unit may be further particularized according to, among other factors, the purpose of the unit or its physical location.

Figure 4:
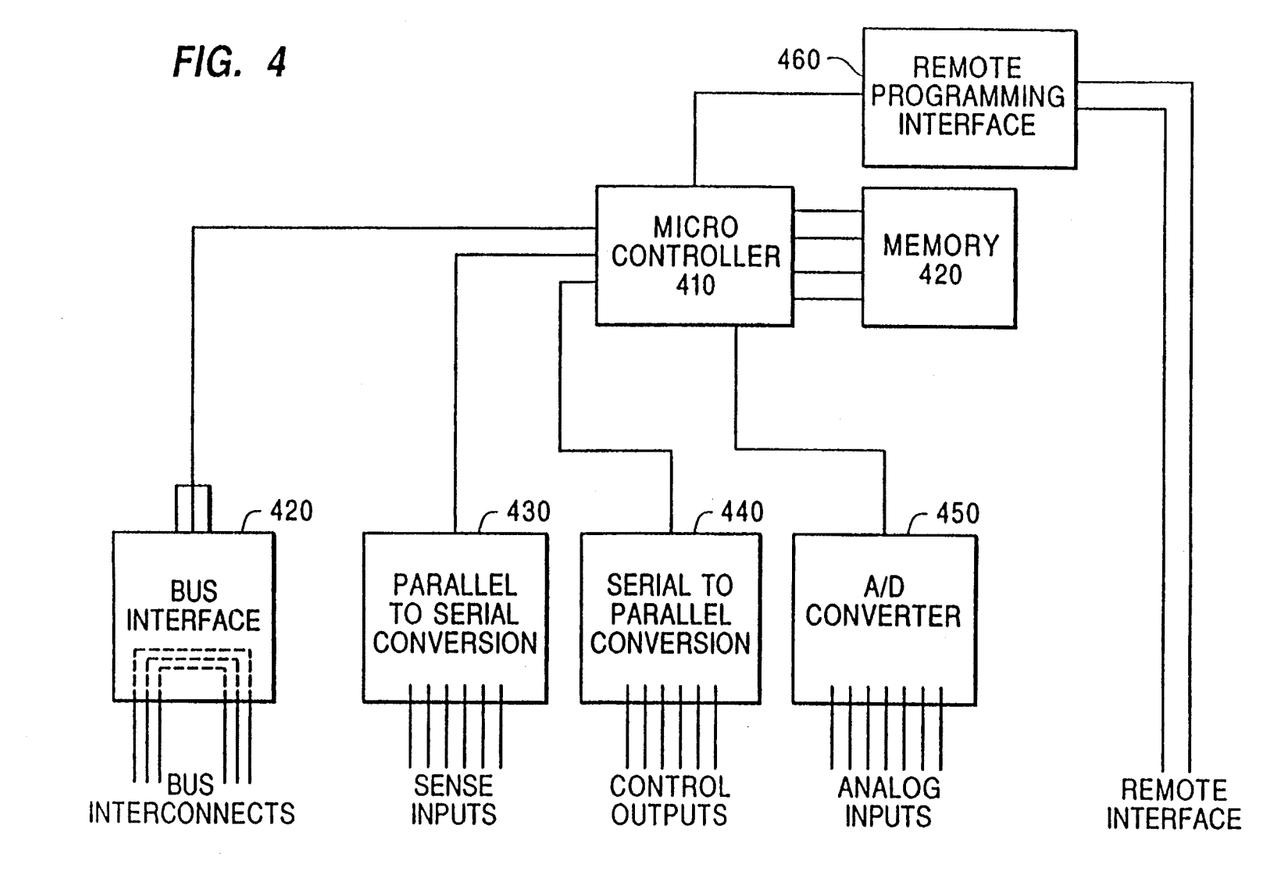
FIG. 4 is a diagram illustrating the components of the monitoring/control unit housed within each component.

A monitor/control unit is illustrated in FIG. 4. The central feature of the unit is a microcontroller 410. The microcontroller 410 provides control of the status monitoring/control functions. Microcontroller 410 receives the query commands from the computer 220. A memory device 420 is provided to store the operating instructions of the microcontroller 410, the current status data of the module, various set up information, and reference windows (described below), among other things. A parallel-to-serial converter 430 is connected to microcontroller 410 for supplying digital sense inputs. A serial-to-parallel converter 440 supplies control output signals from microcontroller 410 to various portions of the component.

An A/D converter 450 is provided for converting analog data from external sensors to digital data for input to microcontroller 410. For example, a temperature sensor (not shown) may supply the module air temperature to microcontroller 410. Interface drivers 470 are provided for the transmission of data between the unit and the bus to which the components at that location are coupled.

The remote programming interface 460 receives signals from, for example, a hand-held terminal. The hand-held terminal is merely a keypad from which the memory 420 can be queried. It is through the hand-held terminal that the address of the module may be changed. The programming interface may also be used to reconfigure a unit.

The monitoring capabilities within the system components are controlled by the monitor/control units. Each unit is programmable. Therefore, the types of functions monitored may vary depending on the function of the component or the types of information desired by the system operator.

In a preferred embodiment, the monitor/control units are capable of processing eleven separate analog signals A00-A10, seven different digital sense signals S00-S06, and eight different control signals C00-C07. As can be seen from the tables below, some of the signals which are monitored are fixed, while others may be programmed. The particular assignments are selected depending on the application of the system component. Tolerance windows are set for monitored values in the system components. If the measured values fall beyond these windows, an alarm is actuated. The alarm may take the form of a buzzer, a bell, a flashing light, a message printed on a computer screen or a printer, or any other conventional communication to the system operator. In addition, an internal fault condition may be actuated. The fault condition is registered on the front panel of the module. Also, the fault condition registers on the back panel to drive an alarm at the site or even a separate CATV component. The alarm signal is used locally to make intelligent decisions, for example, whether to switch on a back up module. Separate fault conditions are generated for separate receivers in a dual receiver system. While this fault condition at the site is separate from the alarm at computer 220, computer 220 monitors whether the module is in a fault condition.

The following tables are provided to illustrate the information monitored in the preferred embodiment.

| FIBER TRANSMITTER | | | |
|---|---|---|---|
| Ch | Description | Max. | Min. |
| A00 | Temperature | 215.00 F | −40.00 |
| A01 | AGC Voltage Scaled | 2.5000 V | 0.0000 |
| A02 | not used | 100.00 | 0.0000 |
| A03 | AC Voltage | 273.00 V | 0.0000 |
| A04 | 24 Volts DC | 30.000 V | 0.0000 |
| A05 | Laser Temp. Scaled | 62.000 C | 0.0000 |
| A06 | 24 Volts Backup | 30.000 V | 0.0000 |
| A07 | Laser Power Scaled | 10.000 mW | 0.0000 |
| A08 | Laser Bias Scaled | 100.00 mA | 0.0000 |
| A09 | +7 Volts DC | 8.7200 V | 0.0000 |
| A10 | −7 Volts DC | 2.1800 V | −9.210 |
| C00 | Backup Control | | |
| C01 | — | | |
| C02 | — | | |
| C03 | — | | |
| C04 | — | | |
| C05 | — | | |
| C06 | — | | |
| C07 | — | | |
| S00 | DC Backup Status | | |
| S01 | Transmitter Status | | |
| S02 | Input Rf Limit Low | | |
| S03 | Transmitter Fault | | |
| S04 | Input Rf Limit High | | |
| S05 | APC Status | | |
| S06 | Laser Temp. Status | | |

| FIBER RECEIVER | | | |
|---|---|---|---|
| Ch | Description | Max. | Min. |
| A00 | Temperature | 215.00 F | −40.00 |
| A01 | AGC Voltage Scaled Rcv2 | 2.5000 V | 0.0000 |
| A02 | not used | 100.00 | 0.0000 |
| A03 | AC Voltage | 273.00 V | 0.0000 |
| A04 | 24 Volts DC | 30.000 V | 0.0000 |
| A05 | AGC Voltage Scaled Rev1 | 2.5000 V | 0.0000 |
| A06 | 24 Volts Backup | 30.000 V | 0.0000 |
| A07 | Optical Pwr Scaled Rev1 | 2.5000 mW | 0.0000 |
| A08 | Optical Pwr Scaled Rcv2 | 2.5000 mW | 0.0000 |
| A09 | +7 Volts DC | 8.7200 V | 0.0000 |
| A10 | −7 Volts DC | 2.1800 V | −9.210 |
| C00 | Backup Control | | |
| C01 | — | | |
| C02 | — | | |
| C03 | — | | |
| C04 | — | | |
| C05 | — | | |
| C06 | — | | |
| C07 | — | | |
| S00 | DC Backup Status | | |
| S01 | Receiver 1 Status | | |
| S02 | Receiver 2 Status | | |
| S03 | Receiver 2 Fault | | |
| S04 | Receiver 2 Fault | | |
| S05 | — | | |

-continued

S06 —

COMBINER

| Ch | Description | Max. | Min. |
| --- | --- | --- | --- |
| A00 | Temperature | 215.00 F | −40.00 |
| A01 | not used | 100.00 | 0.0000 |
| A02 | not used | 100.00 | 0.0000 |
| A03 | AC Voltage | 273.00 V | 0.0000 |
| A04 | 24 Volts DC | 30.000 V | 0.0000 |
| A05 | not used | 100.00 | 0.0000 |
| A06 | 24 Volts Backup | 30.000 V | 0.0000 |
| A07 | not used | 100.00 | 0.0000 |
| A08 | not used | 100.00 | 0.0000 |
| A09 | not used | 100.00 | 0.0000 |
| A10 | not used | 100.00 | 0.0000 |
| C00 | Control 4 | | |
| C01 | Control 3 | | |
| C02 | Control 2 | | |
| C03 | Control 1 | | |
| C04 | Backup Control | | |
| C05 | — | | |
| C06 | — | | |
| C07 | — | | |
| S00 | Switch 3 State | | |
| S01 | Switch 1 State | | |
| S02 | Switch 2 State | | |
| S03 | DC Backup Status | | |
| S04 | — | | |
| S05 | — | | |
| S06 | — | | |

STATUS MONITORING INTERFACE UNIT

| Ch | Description | Max. | Min. |
| --- | --- | --- | --- |
| A00 | Temperature | 215.00 F | −40.00 |
| A01 | not used | 100.00 | 0.0000 |
| A02 | not used | 100.00 | 0.0000 |
| A03 | AC Voltage | 140.20 V | 0.0000 |
| A04 | 24 Volts DC | 30.000 V | 0.0000 |
| A05 | not used | 100.00 | 0.0000 |
| A06 | not used | 100.00 | 0.0000 |
| A07 | 24 Volts Backup | 30.000 V | 0.0000 |
| A08 | not used | 100.00 | 0.0000 |
| A09 | not used | 100.00 | 0.0000 |
| A10 | not used | 100.00 | 0.0000 |
| C00 | not available | | |
| C01 | Backup Control | | |
| C02 | — | | |
| C03 | — | | |
| C04 | — | | |
| C05 | — | | |
| C06 | — | | |
| C07 | — | | |
| S00 | not available | | |
| S01 | DC Backup Status | | |
| S02 | Rf Switch Sense | | |
| S03 | — | | |
| S04 | — | | |
| S05 | — | | |
| S06 | — | | |

FIBER OPTIC SWITCH CONTROLLER

| Ch | Description | Max. | Min. |
| --- | --- | --- | --- |
| A00 | Temperature | 215.00 F | −40.00 |
| A01 | not used | 100.00 | 0.0000 |
| A02 | not used | 100.00 | 0.0000 |
| A03 | AC Voltage | 191.00 V | 0.0000 |
| A04 | 24 Volts DC | 30.000 V | 0.0000 |
| A05 | +15 Volts | 18.700 V | 0.0000 |
| A06 | 24 Volts Backup | 30.000 V | 0.0000 |
| A07 | +5 Volts DC | 6.2500 V | 0.0000 |
| A08 | not used | 100.00 | 0.0000 |
| A09 | not used | 100.00 | 0.0000 |
| A10 | not used | 100.00 | 0.0000 |
| C00 | Backup Control | | |
| C01 | Switch 1 Control | | |
| C02 | Switch 2 Control | | |
| C03 | Switch 3 Control | | |
| C04 | Switch 4 Control | | |
| C05 | — | | |
| C06 | — | | |
| C07 | — | | |

-continued

| | | |
| --- | --- | --- |
| S00 | Switch 1 State | |
| S01 | Switch 2 State | |
| S02 | Switch 3 State | |
| S03 | Switch 4 State | |
| S04 | DC Backup Status | |
| S05 | — | |
| S06 | — | |

As can be seen from the above tables, one of the analog signals which is monitored is the air temperature within the module. However, the invention is not limited in this respect. It is contemplated that a temperature from any point may be measured. Alternatively, a temperature may not be measured at all. As above, the particular assignments are selected depending on the application of the system component and the specific information desired by the system operator. Therefore, any relevant value accessible from the modules can be monitored. In addition, each module may be uniquely programmed. The AGC voltages identified are described in commonly assigned Application entitled "System Level Control in a Fiber Communication System" U.S. Pat. No. 5,267,071, incorporated herein by reference.

The modules also monitor seven digital sense levels. For example, S03 reports a signal back to computer 220 if the transmitter module is in a fault condition. A low and a high RF limit signal S02, S04 are monitored whereby if the ranges are exceeded, the transmitter is shut off. The transmitter status S01 is monitored with respect to DC voltages that must be kept within tight windows to ensure proper operation. As above, each of these status conditions is programmable and may be different for receivers or other components such as, but not limited to, an optical combiner and an optical switch, or RF controller.

Seven control lines exist in each module. The control lines are controllable from computer 220. An operator may toggle a control output high or low. This control output is read as a command control signal by the monitoring/control unit. In response the monitoring/control unit issues control signals to other components. One such control signal may remotely switch from AC power to DC power. The operator may then monitor other data sensed by the module. In the above example, if the DC power dips to an unacceptable level when the back up battery is switched in, it may be determined that the battery is weak. In this manner, it may be determined whether the back up battery is operating at an acceptable level. If the battery voltage drops too low, the module reverts back to AC so that the communication link is not broken.

Alternatively, a control line may control an optical switch. In addition, a sensing line may report the status of the switch. Furthermore, the control lines may control inputs to the logic that controls an optical switch. In this manner, it may be determined if the switch changes positions properly in response to inputs.

As is clear from the above, the status monitoring unit can monitor information concerning transmitters, receivers, combiners, optical switches, and RF controllers. However, the invention is not limited in this respect. As is clear to those skilled in the art, any component can be monitored.

As described above, if one of the measured analog values falls outside of the windows or one of the digital levels change, the module reports a change when polled. However, if the measured signal fluctuates within the preset windows and none of the digital levels change, a "NO CHANGE" response is transmitted from the module. As described below, the operator may choose to call up all of the current status data regardless if no change occurs. If a trouble spot is known, the operator may continuously monitor the module as described above.

In summary, the preferred status monitoring system monitors: (1) eleven analog levels; (2) seven digital sense lines; and (3) seven control lines. Therefore, two way digital communication is achieved and different operational modes may be verified. The central computer may, for example, toggle on the DC back up power of a particular module and then monitor sense lines to see if a fault is generated. An optical switch or other equipment may be monitored. The status monitoring system is programmable, and thus supports a variety of applications. The operation of remote modules may be analyzed without requiring an on site inspection by a trained technician. Therefore, the operator may become aware of a potential problem before it occurs.

Figure 5:
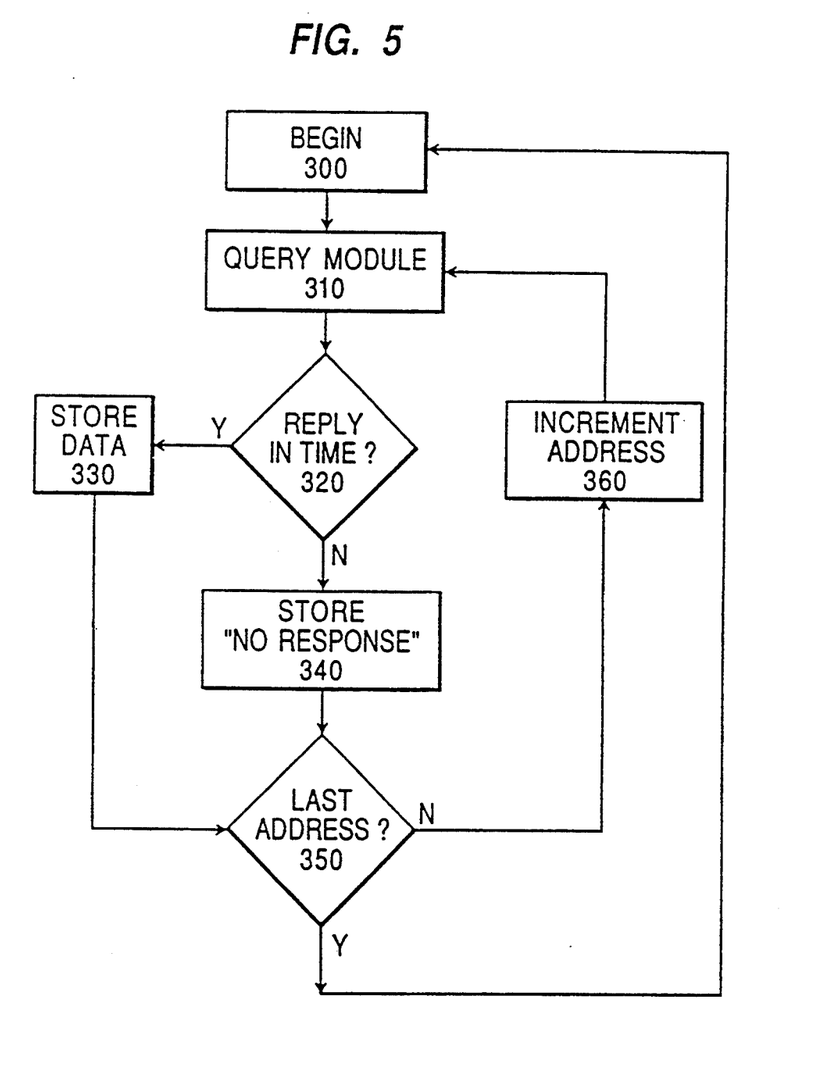
FIG. 5 is a flow chart illustrating the operation of the status monitoring system of the present invention.

The operation of the monitoring system will be described with reference to FIG. 5. Each of the monitor/control units has a unique address stored in its memory. The address may be programmed at the factory before installation or on site. Furthermore, the address may be changed in order to facilitate system reconfiguration. Polling by computer 220 is initiated with a first address at step 300. Computer 220 sends a query command to the component corresponding to the first address at step 310.

The query command is sent to RF subsystem 210 over communication link 240. The query command is received at communication interface module 212. CIM 212 provides the command to bus 301 connecting each of the components at the master hub. Thus, the command is distributed to each of the components at the master hub.

The query command is also forwarded from communication interface module 212 to transmitter 214. The query command is frequency modulated and combined with the lowband RF input to transmitter 201b for transmission over optical fiber 202b.

Receiver 260b receives the optical signal of optical fiber 202b and converts the optical signal to an RF signal. The 75.25 MHz signal from transmitter 214 is recovered and provided to receiver 269 of status monitoring interface unit 266. Receiver 269 demodulates the signal and provides the demodulated signal to CIM 267 and the unit monitor/control unit 403 of SMUI 266 itself. CIM 267 provides the query command to the remote hub components over the XMT line of bus 381. After sending a query command, computer 220 waits for a reply from the addressed module at step 320.

Each monitor/control unit receives the query, deciphers it, and replies if it is the unit addressed. Only the module addressed will reply to the query. Where the addressed module is at master hub 100, the reply data from the addressed component is transmitted back along the RCV line of bus 301 to CIM 212. The reply data is then forwarded from communication interface module 212 to computer 220 though line 242 of communication link 240.

When the addressed module is at remote hub 110a, the reply data is transmitted along the RCV line of bus to the bus port of CIM 267. The reply data is forwarded from CIM 267 to transmitter 268. FSK transmitter 268 modulates the reply data and transmits a 17.5 MHz signal to reverse fiber transmitter 270 for transmission to the master hub. Reverse receiver 228 receives the optical signal from reverse transmitter 270 and converts it to an RF signal. The recovered 17.5 MHz signal is provided to receiver 213. Receiver 213 demodulates the 17.5 MHz signal and supplies the reply data to communication interface module 212. The reply data is forwarded to computer 220 from the communication interface module 2 12 through communication link 240.

If a reply is received by computer 220, the received data is stored at step 330. If the computer 220 receives no response from the module after a predetermined time, the computer at step 340 stores a "NO RESPONSE" signal. The received information may be presented on a screen of computer 220 or in any other manner.

After the data is stored, the process proceeds to step 350. At step 350 the computer determines if the last address was accessed. If the computer is not on the last address, the address is incremented at step 360. The process then returns to step 310 and the module corresponding to the next address is queried. If the last address was accessed, the computer begins the routine with the first address. Alternatively, a single component may be monitored continuously by instructing the computer to poll a particular module repeatedly rather than each module in sequence. During the time the computer is waiting for a response from a given module, it may be utilized to process the data it has previously received.

Three different types of query commands may be issued by computer 220. A simple query commands a polled component to report whether there have been any changes in status since the last time the component was polled. A polled component may return a "NO CHANGE" signal if its status has not changed since the last query. In this manner, the transmission of redundant information is avoided. The second type of query is a full detail query. In response to a full detail query, a polled component returns information rearding each condition which is monitored by the monitor/control unit of that component. A full detail query may also instruct a monitor/control unit to control certain control lines at the component and report how conditions at the component are affected by the control. Finally, a third query command permits a control line to be pulled HI or LO. The component merely reports that it received the command and does not report how conditions at the component are affected.

The invention has been described in detail in connection with the preferred embodiments. These embodiments, however, are merely for example only and the invention is not restricted thereto. It will be easily understood by those skilled in the art that other variations and modifications can easily be made within the scope of the invention as defined by the appended claims.

I claim:

1. A status monitoring system for a cable television system including a master hub having a plurality of transmitters for transmitting cable television signals, and at least one remote hub having a plurality of receivers for receiving said cable television signals, said status monitoring system comprising:

transmitter monitoring/control units for respectively monitoring and controlling the plurality of transmitters, each said transmitter monitoring/control unit having first and second ports that are coupled together;

receiver monitoring/control units for respectively monitoring and controlling the plurality of receivers, each said receiver monitoring/control unit having first and second ports that are coupled together;

a status monitoring interface unit, located at the remote hub, for receiving status information from said receiver monitoring/control units and for transmitting the status information over a communication link between the remote hub and the master hub, wherein the first port of a first receiver monitoring/control unit of said receiver monitoring/control units is coupled to said status monitoring interface unit and the first port of the remaining receiver monitoring/control units are each coupled to the second port of another of said receiver monitoring/control units thereby forming a receiver monitoring/control common bus for coupling status information from said receiver monitoring/control units to said status monitoring interface unit;

an interface located at said master hub for receiving the status information transmitted from said status monitoring interface unit over the communication link and for receiving status information from said transmitter monitoring/control units wherein the first port of a first transmit or monitoring/control unit of said transmitter monitoring/control units is coupled to said interface and the first port of the remaining transmitter monitoring/control units are each coupled to the second port of another of said transmitter monitoring/control units thereby forming a transmitter monitoring/control common bus for coupling status information from said transmitter monitoring/control units to said interface; and a computer, located at said master hub and operatively connected to said interface, for receiving the status information from said transmitter monitoring/control units and said receiver monitoring/control units via said interface.

2. The status monitoring system for a cable television system according to claim 1, wherein:

the receiver monitoring/control units are located in each of the plurality of receivers.

3. The status monitoring system for a cable television system according to claim 1, wherein:

the transmitter monitoring/control units are located in each of the plurality of transmitters.

4. The status monitoring system for a cable television system according to claim 1, wherein:

the receiver monitoring/control units are located in each of the plurality of receivers; and the transmitter monitoring/control units are located in each of the plurality of transmitters.

5. The status monitoring system for a cable television system according to claim 4, wherein said cable television system further includes a plurality of remote hubs, each having a plurality of receivers for receiving said cable television signals and each being coupled to the master hub via a corresponding communication link, said status monitoring system further comprising:

a plurality of receiver monitoring/control units located at each remote hub, each said receiver monitoring/control unit being associated with one of the plurality of receivers;

a status monitoring interface unit located at each of said plurality of remote hubs for transmitting status information received from said receiver monitoring/control units located at the same remote hub to said interface over the corresponding communication link; and a plurality of common buses, each located at a respective remote hub of said plurality of remote hubs, for connecting said receiver monitoring/control units at said respective remote hub to said status monitoring interface unit at said respective remote hub.

6. The status monitoring system for a cable television system according to claim 5, wherein:

each of said receiver monitoring/control units and said transmitter monitoring/control cards has a unique address;

said computer includes command transmit means for transmitting commands to an addressed monitoring/control unit; and said addressed monitoring/control unit executes predetermined functions in response to said commands.

7. The status monitoring system for a cable television system according to claim 6, wherein:

said command transmit means includes query command transmit means for transmitting a query command to said addressed monitoring/control unit; and said addressed monitoring/control unit transmits status information in response to said query command to said computer either (1) via said interface and said status monitoring interface unit at the remote hub where said addressed monitoring/control unit is located if said addressed monitoring/control unit is a receiver monitoring/control unit or (2) via said interface if said addressed monitoring/control unit is a transmitter monitoring/control unit.

8. The status monitoring system for a cable television system according to claim 6, wherein:

said command transmit means includes control command transmit means for transmitting a control command to said addressed monitoring/control unit and query command transmit means for transmitting a query command to said addressed monitoring/control unit; and said addressed monitoring/control unit issues control signals to its corresponding receiver in response to said control command and transmits status information of its corresponding receiver in response to said query command to said computer either (1) via said interface and said status monitoring interface unit at the remote hub where said addressed monitoring/control unit is located if said addressed monitoring/control unit is a receiver monitoring/control unit or (2) via said interface if said addressed monitoring/control unit is a transmitter monitoring/control unit.

9. A status monitoring system for monitoring a plurality of transmitters at a common location for transmitting television signals in a cable television transmitting system comprising:

a plurality of status monitoring/control units having first and second ports coupled together, wherein each said status monitoring/control unit monitors and controls operations of a corresponding transmitter of said plurality of transmitters and transmits monitored information over at least one of the first and second ports;

an interface in communication with said plurality of status monitoring/control units, wherein the first port of a first status monitoring/control unit of said plurality of status monitoring/control units is coupled to said interface and the second port of the remaining status monitoring/control units are each coupled to the first port of another of said status monitoring/control units thereby forming a common status monitoring/control bus for coupling the monitored information from said status monitoring/control units to said interface.; and a computer, operatively connected to said interface, for receiving the monitored information from said status monitoring/control units.

10. The status monitoring system according to claim 9, wherein each transmitter is an optical transmitter.

11. The status monitoring system according to claim 10, wherein each said status monitoring/control unit comprises means for monitoring analog voltage levels of the corresponding optical transmitter.

12. The status monitoring system according to claim 12, wherein each said status monitoring/control unit further comprises:

storage means for storing threshold windows corresponding to said monitored analog voltage levels;

comparison means for comparing a monitored analog voltage level with a corresponding threshold window; and means for generating an alarm if said monitored analog signal falls outside of the threshold window.

13. The status monitoring system according to claim 10, wherein each said status monitoring/control unit comprises means for monitoring a digital status of the corresponding optical transmitter.

14. The status monitoring system according to claim 10, wherein:

said computer includes control means for generating control command signals to control the operation of said transmitters; and each said status monitoring/control unit includes means for receiving the control command signals via said interface and said common status monitoring/control bus, means for generating control signals in response to the received control command signals, and means for forwarding the control signals to the corresponding optical transmitter, whereby the operation of the corresponding optical transmitter is controlled in accordance with said control signals.

15. The status monitoring system according to claim 10, wherein:

each of said plurality of status monitoring/control units has a unique address;

said computer includes query transmit means for transmitting via said interface and said common status monitoring/control bus a query command to each of said plurality of said status monitoring/control units in sequence according to the addresses thereof; and said status monitoring/control unit transmits the monitored information to said computer via said common status monitoring/control bus and said interface in response to the query command.

16. The status monitoring system according to claim 10, wherein:

each of said plurality of status monitoring/control units has a unique address;

said computer includes query transmit means for transmitting via said interface and said common status monitoring/control bus a query command to an addressed status monitoring/control unit according to the address thereof; and said addressed status monitoring/control unit transmits the monitored information to said computer via said common status monitoring/control bus and said interface in response to the query command.

17. The status monitoring system according to claim 16, wherein:

said query transmit means transmits the query command repeatedly to said addressed status monitoring/control unit such that the monitored information from said addressed status monitoring/control unit can be monitored at said computer substantially continuously.

18. A status monitoring system for monitoring a plurality of receivers at a common location for receiving television signals in a cable television receiving system comprising:

a plurality of status monitoring/control units having first and second ports coupled together, wherein each said status monitoring/control unit monitors and controls operations of a corresponding receiver of said plurality of receivers and transmits the monitored information over at least one of the first and second ports; and a status monitoring interface unit operatively connected for receiving the monitored information from said plurality of status monitoring/control units and for transmitting the monitored information to a transmitter for transmission to a central controller, wherein the first port of a first status monitoring/control unit of said plurality of status monitoring/control units is coupled to said interface and the second port of the remaining status monitoring/control units are each coupled to the first port of another of said status monitoring/control units thereby forming a common status monitoring/control bus for coupling the monitored information from said status monitoring/control units to said status monitoring interface unit.

19. The status monitoring system according to claim 18, wherein each of said plurality of receivers includes an optical receiver.

20. The status monitoring system according to claim 19, wherein each said status monitoring/control unit comprises means for monitoring analog voltage levels of said optical receiver.

21. The status monitoring system according to claim 20, wherein each said status monitoring/control unit further comprises:

storage means for storing threshold windows corresponding to said monitored analog voltage levels;

comparison means for comparing a monitored analog voltage level with a corresponding threshold window; and means for generating an alarm if said monitored analog signal falls outside of the threshold window.

22. The status monitoring system according to claim 19, wherein each said status monitoring/control unit comprises means for monitoring a digital status of said corresponding optical receiver.

23. The status monitoring system according to claim 19, wherein:

said central controller generates control command signals to control the operation of said plurality of receivers;

said status monitoring interface unit comprises means for receiving said control command signals and for supplying control command signals to said common status monitoring/control bus; and each said status monitoring/control unit includes means for receiving the control command signals from said common status monitoring/control bus, means for generating control signals in response to the control command signals, and means for forwarding the control signals to said optical receiver, whereby the operation of said optical receiver is controlled in accordance with said control signals.

24. The status monitoring system according to claim 19, wherein:

each of said status monitoring/control units has a unique address;

said status monitoring interface unit comprises means for receiving from the central controller via said plurality of optical receivers a query command addressed to each of said plurality of receiver modules in sequence; and each said status monitoring/control unit transmits in response to the query command the monitored information to said central controller via said common status monitoring/control bus, said status monitoring interface unit, and the transmitter.

25. The status monitoring system according to claim 23, wherein:

each of said status monitoring/control units has a unique address;

said status monitoring/control unit comprises means for receiving from said central controller via said plurality of receivers a query command to an addressed status monitoring/control unit; and said addressed status monitoring/control unit transmits in response to the query command the monitored information to said central controller via said common status monitoring control bus, said status monitoring interface unit, and the transmitter.

26. The status monitoring system according to claim 25, wherein:

said query transmit means transmits the query command repeatedly to said addressed status monitoring/control unit such that the monitored information from said addressed status monitoring/control unit can be monitored at said central computer substantially continuously.

27. A status monitoring system for a television system including a master hub having a plurality of optical transmitters for transmitting television signals and control signals as optical signals and a reverse receiver, a remote hub having a plurality of optical receivers for receiving the optical signals and for demodulating the optical signals into television signals and control signals and a reverse transmitter for transmitting information signals to the reverse receiver, an optical communication link coupling the optical transmitters and optical receivers, and a communication link coupling said reverse transmitter and reverse receiver, said status monitoring system comprising:

a plurality of transmitter status monitoring/control units for monitoring the status of respective optical transmitters and for controlling an operation thereof, each said transmitter status monitoring/control unit comprising data transmitting means for transmitting status information data, and data receiving means for receiving control data;

a plurality of receiver status monitoring/control units for monitoring the status of respective optical receivers and for controlling an operation thereof, each said receiver status monitoring/control unit comprising data transmitting means for transmitting status information data, and data receiving means for receiving control data;

first and second common data buses, wherein said first common data bus comprises a first data line that couples in common said data transmitting means and a second data line that couples in common said data receiving means of said transmitter status monitoring/control units and wherein said second common data bus comprises a first data line that couples in common said data transmitting means and a second data line that couples in common said data receiving means of said receiver status monitoring/control units;

a central computer, located at the master hub, for receiving status information data from and transmitting control data to said transmitter monitoring/control units and said receiver monitoring/control units;

a status monitoring interface unit, located at the remote hub, (1) for receiving status information data from said receiver status monitoring/control units via said second common data bus and for transmitting status information generated from the received status information data to the reverse transmitter for transmission to the reverse receiver at the master hub over the communication link and (2) for receiving control signals from at least one of the optical receivers and for transmitting control data generated from the received control signals to said receiver status monitoring/control units via the second common data bus; and an interface, located at the master hub, (1) for receiving status information from the reverse receiver, (2) for receiving status information data from said transmitter status monitoring/control units, (3) for transmitting status information data generated from the received status information and the status information data received from said transmitter status monitoring/control units to said central computer, (4) for receiving control data from said central computer, (5) for transmitting the received control data to said transmitter status monitoring/control units over said first data bus, and (6) for transmitting control signals generated from the received control data to at least one optical transmitter for transmission over the optical communication link to the at least one optical receiver of the remote hub.

28. The status monitoring system according to claim 27, wherein the demodulated control signals are radio-frequency control signals and wherein said status monitoring interface unit comprises:

a radio-frequency receiver for receiving the radio-frequency control signals from the at least one optical receiver and for generating control data from the received radio-frequency control signals;

a radio-frequency transmitter for generating radio-frequency status information from status information data and for transmitting the radio-frequency status information to the reverse transmitter; and a communications interface module for coupling said radio-frequency transmitter and said radio-frequency receiver to said second common data bus thereby supplying status information data from said receiver status monitoring/control units to said radio-frequency transmitter and supplying control data from said radio-frequency receiver to said receiver status monitoring/control units.

29. The status monitoring system according to claim 27, wherein the control signals transmitted from said interface to the at least one optical transmitter are radio-frequency control signals, the status information received from the reverse receiver is radio-frequency status information, and said interface comprises:

a radio-frequency receiver for receiving the radio-frequency status information from the reverse receiver and for generating status information data therefrom;

a radio-frequency transmitter for generating radio-frequency control signals from control data and for transmitting the radio-frequency control signals to at least one of the optical transmitters; and a communications interface module coupling said radio-frequency receiver and said radio-frequency transmitter to said central computer thereby supplying status information data from said radio-frequency receiver to said central computer and supplying control data from said central computer to said radio-frequency transmitter.

30. The status monitoring system according to claim 29, wherein the demodulated control signals are radio-frequency control signals and wherein said status monitoring interface unit comprises:

a radio-frequency receiver for receiving the radio-frequency control signals from the at least one optical receiver and for generating control data from the received radio-frequency control signals;

a radio-frequency transmitter for generating radio-frequency status information from status information data and for transmitting the radio-frequency status information to the reverse transmitter; and a communications interface module for coupling said radio-frequency transmitter and said radio-frequency receiver to said second common data bus thereby supplying status information data from said receiver status monitoring/control units to said radio-frequency transmitter and supplying control data from said radio-frequency receiver to said receiver status monitoring/control units.

31. The status monitoring system according to claim 30, wherein:

each said receiver status monitoring/control unit comprises first and second transmitting data ports coupled in common to said data transmitting means and first and second receiving data ports coupled in common to said data receiving means; and said second common data bus comprises (1) a first data bus link coupling said communications interface module of said status monitoring interface unit to the first transmitting data port and to the first receiving data port of a first of said plurality of receiver status monitoring/control units and (2) further data bus links coupling the first transmitting data port and the first receiving data port of each receiver status monitoring/control units other than said first receiver status monitoring/control unit to the second transmitting data port and the second receiving data port, respectively, of another receiver status monitoring/control unit, whereby each of the receiver status monitoring/control units is linked in parallel to the communications interface module of said status monitoring interface unit.

32. The status monitoring system according to claim 31, wherein:

each said transmitter status monitoring/control unit comprises first and second transmitting data ports coupled in common to said data transmitting means and first and second receiving data ports coupled in common to said data receiving means; and said first common data bus comprises (1) a first data bus link coupling said communications interface module of said interface to the first transmitting data port and to the first receiving data port of a first of said plurality of transmitter status monitoring/control units and (2) further data bus links coupling the first transmitting data port and the first receiving data port of each transmitter status monitoring/control units other than said first transmitter status monitoring/control unit to the second transmitting data port and the second receiving data port, respectively, of another transmitter status monitoring/control unit, whereby each of the transmitter status monitoring/control units is linked in parallel to the communications interface module of said interface.

33. The status monitoring system according to claim 32, wherein the reverse transmitter is a reverse optical transmitter, the reverse receiver is a reverse optical receiver, and the communication link is an optical communication link.

34. The status monitoring system according to claim 32, wherein:

each of said transmitter and receiver status monitoring/control units has a unique address;

the control data transmitted by said central computer includes query control data and one of the unique addresses thereby defining an addressed status monitoring/control unit, and the query control data and the unique address are transmitted to said transmitter status monitoring/control units via said interface and said first common data bus and to said receiver status monitoring/control units via said interface, the at least one optical transmitter, the at least one optical receiver, the status monitoring interface unit, and said second common data bus; and the addressed status monitoring/control unit, responsive to the query control data, transmits status control data for reception by said central computer.

35. The status monitoring system according to claim 32, wherein the television system further comprises:

additional reverse receivers at the master hub;

additional remote hubs, each of the additional remote hubs having a plurality of optical receivers for receiving the optical signals and for demodulating the optical signals into television signals and control signals and a reverse transmitter for transmitting information signals;

optical communication links coupling the optical transmitters at the master hub to the optical receivers at respective additional remote hubs; and communication links coupling the reverse transmitters at the additional remote hubs to respective reverse receivers at the master hub, wherein said status monitoring system further comprises:

a combiner at the master hub coupling each of the additional reverse receivers to said radio-frequency receiver of said interface;

a plurality of receiver status monitoring/control units at each of said additional remote hubs for monitoring the status of respective optical receivers and for controlling an operation thereof, each said receiver status monitoring/control unit comprises data transmitting means for transmitting status information data and data receiving means for receiving control data;

additional common data buses, each located at one of the additional remote hubs, wherein each said additional common data bus couples in common said data transmitting means and couples in common said data receiving means of said receiver status monitoring/control units at its remote hub;

additional status monitoring interface units, each located at one of the additional remote hubs, wherein each said additional status monitoring unit (1) receives status information data from said receiver status monitoring/control units at its remote hub via a corresponding common data bus and transmits status information generated from the received status information data to the reverse transmitter at its remote hub for transmission to one of the reverse receivers at the master hub over one of the additional communication links and (2) receives control signals from at least one of the optical receivers at its remote hub and transmits control data generated from the received control signals to said receiver status monitoring/control units at its remote hub via the corresponding common data bus.

36. The status monitoring system according to claim 35, wherein:

each of said transmitter and receiver status monitoring/control units has a unique address;

the control data transmitted by said central computer includes query control data and one of the unique addresses thereby defining an addressed status monitoring/control unit, and the query control data and the unique address are transmitted to said transmitter status monitoring/control units via said interface and said first common data bus and to said receiver status monitoring/control units via said interface, the optical transmitters, the optical receivers, the status monitoring interface unit, and said second common data bus; and the addressed status monitoring/control unit, responsive to the query control data, transmits status control data for reception by said central computer.

37. A status monitoring system for monitoring optical transmitters that transmit television signals as optical signals in a television transmitting system, the status monitoring system comprising:

a plurality of status monitoring/control units for monitoring the status of respective optical transmitters and for controlling an operation thereof, each said status monitoring/control unit comprising data transmitting means for transmitting status information data and data receiving means for receiving control data;

a common data bus coupling in common the data receiving means and coupling in common the data transmitting means of said status monitoring/control units;

a computer for receiving status information data from and transmitting control data to said status monitoring/control units; and a communications interface module coupling said computer to said common data bus thereby supplying control data from said computer to said data receiving means of said status monitoring/control units and supplying status information data from said data transmitting means to said computer.

38. The status monitoring system according to claim 37, wherein each said status monitoring/control unit comprises means for monitoring analog voltage levels of its respective optical transmitter.

39. The status monitoring system according to claim 38, wherein each said status monitoring/control unit further comprises:

storage means for storing threshold windows corresponding to said monitored analog voltage levels;

means for comparing a monitored analog voltage level with a corresponding threshold window; and means for generating an alarm if said monitored analog signal falls outside of the threshold window.

40. The status monitoring system according to claim 37, wherein each said status monitoring/control unit comprises means for monitoring a digital status of its respective optical transmitter.

41. The status monitoring system according to claim 37, wherein each said status monitoring/control unit includes means for generating control signals in response to the received control data and for applying the control signals to its respective optical transmitter, whereby the operation of the respective optical transmitter is controlled in accordance with said control signals.

42. The status monitoring system according to claim 37, wherein each of said plurality of status monitoring/control units has a unique address.

43. The status monitoring system according to claim 37, wherein:

each said status monitoring/control unit comprises first and second transmitting data ports coupled in common to said data transmitting means and first and second receiving data ports coupled in common to said data receiving means; and said common data bus comprises (1) a first data bus link coupling said communications interface module to the first transmitting data port and the first receiving data port of a first of said plurality of status monitoring/control units and (2) further data bus links coupling the first transmitting data port and the first receiving data port of each status monitoring/control units other than said first status monitoring/control unit to the second transmitting data port and the second receiving data port of another status monitoring/control unit, respectively, whereby each of the status monitoring/control units is linked in parallel to the communications interface module.

44. The status monitoring system according to claim 43, wherein:

the television transmitting system further comprises a reverse receiver for outputting radio-frequency status information; and at least one of the optical transmitters further transmits radio-frequency control signals as optical signals, said status monitoring system further comprises:

a radio-frequency transmitter for generating radio-frequency control signals from control data received from said computer via said communications interface module and for transmitting the radio-frequency control signals to the at least one optical transmitter for transmission as optical signals; and a radio-frequency receiver for receiving radio-frequency status information from the reverse receiver, for generating status information data from the received radio-frequency status information, and for supplying the generated status information data to said computer via said communications interface module.

45. A status monitoring system in a remote hub of a television system, the remote hub including a reverse transmitter for transmitting information to a central location and a plurality of optical receivers for receiving optical signals and for demodulating the received optical signals into broadband television signals and radio-frequency control signals, said status monitoring system comprising:

a plurality of status monitoring/control units for monitoring the status of respective optical receivers, each said status monitoring/control unit comprising data transmitting means for transmitting status information data and data receiving means for receiving control data;

a common data bus coupling in common the data receiving means and coupling in common the data transmitting means of said status monitoring/control units;

a status monitoring interface unit comprising:
  (1) a radio-frequency receiver for receiving radio-frequency control signals from the optical receivers and for generating control data therefrom;
  (2) a radio-frequency transmitter for generating radio-frequency status information from status information data and for transmitting the radio-frequency status information to the reverse transmitter; and
  (3) a communications interface module coupling said radio-frequency transmitter and said radio-frequency receiver to said common data bus thereby supplying status information data from said data transmitting means of said status monitoring/control units to said radio-frequency transmitter and supplying control data from said radio-frequency receiver to said data receiving means of said status monitoring/control units.

46. The status monitoring system according to claim 45, wherein each said status monitoring/control unit comprises means for monitoring analog voltage levels of its respective optical receiver.

47. The status monitoring system according to claim 46, wherein each said status monitoring/control unit further comprises:
storage means for storing threshold windows corresponding to said monitored analog voltage levels;
comparison means for comparing a monitored analog voltage level with a corresponding threshold window; and
means for generating an alarm if said monitored analog signal falls outside of the threshold window.

48. The status monitoring system according to claim 45, wherein said status monitoring/control unit comprises means for monitoring a digital status of its respective optical receiver.

49. The status monitoring system according to claim 45, wherein each said status monitoring/control unit includes means for generating control signals in response to the received control data and for applying the control signals to its respective optical receiver, whereby the operation of the respective optical receiver is controlled in accordance with said control signals.

50. The status monitoring system according to claim 45, wherein each of said status monitoring/control units stores a unique address.

51. The status monitoring system according to claim 45, wherein:
each said status monitoring/control unit comprises first and second transmitting data ports coupled in common to said data transmitting means and first and second receiving data ports coupled in common to said data receiving means; and
said common data bus comprises (1) a first data bus link coupling said communications interface module to the first transmitting data port and the first receiving data port of a first of said plurality of status monitoring/control units and (2) further data bus links coupling the first transmitting data port and the first receiving data port of each status monitoring/control units other than said first status monitoring/control unit to the second transmitting data port and the second receiving data port of another status monitoring/control unit, respectively, whereby each of the status monitoring/control units is linked in parallel to the communications interface module.

* * * * *